United States Patent [19]

Ishihara

[11] Patent Number: 5,737,654
[45] Date of Patent: Apr. 7, 1998

[54] CAMERA, AND APPARATUS FOR CAMERA

[75] Inventor: Masaaki Ishihara, Yokohama, Japan

[73] Assignee: Canon Kabushiki Kaisha, Tokyo, Japan

[21] Appl. No.: 777,421

[22] Filed: Dec. 30, 1996

[30] Foreign Application Priority Data

Jan. 12, 1996 [JP] Japan ................................. 8-020712

[51] Int. Cl.⁶ ................................................ G03B 17/24
[52] U.S. Cl. .................................... 396/319; 396/390
[58] Field of Search ............................. 396/310, 319, 396/390

[56] References Cited

U.S. PATENT DOCUMENTS

| | | | |
|---|---|---|---|
| 4,864,332 | 9/1989 | Harvey | 396/319 |
| 4,947,197 | 8/1990 | Smart et al. | 396/390 |
| 5,006,873 | 4/1991 | Wash | 396/390 |
| 5,325,138 | 6/1994 | Nagata | 396/319 |
| 5,479,226 | 12/1995 | Kazami et al. | 396/390 |
| 5,530,497 | 6/1996 | Ishihara et al. | 396/319 |
| 5,579,067 | 11/1996 | Wakabayashi | 396/319 |
| 5,598,236 | 1/1997 | Ueda et al. | 396/390 |

*Primary Examiner*—Russell E. Adams
*Attorney, Agent, or Firm*—Robin, Blecker, Daley and Driscoll

[57] ABSTRACT

A camera or an apparatus for a camera, which is arranged to record photographed-frame information indicative of a photographed frame on photographed frames of a film on a frame-by-frame basis, comprises an indication device which gives a midroll interrupt indication for rewinding a film which is partway used into a film cartridge, a film transport device which rewinds the film which is partway used into the film cartridge in accordance with the midroll interrupt indication given by the indication device, and a determination device which determines whether the photographed-frame information is recorded on photographed frames of the film on a frame-by-frame basis, while the film transport device is rewinding the film into the film cartridge in accordance with the midroll interrupt indication given by the indication device.

21 Claims, 10 Drawing Sheets

CAMERA, AND APPARATUS FOR CAMERA

BACKGROUND OF THE INVENTION

1. Field of the Invention

The present invention relates to an apparatus such as a camera which employs a film having an information recording portion such as a magnetic storage portion, and more particularly to an apparatus such as a camera which is capable of performing recording and reproduction of information on and from the information recording portion.

2. Description of Related Art

A so-called MRI (midroll interrupt) type of camera employing a conventional film having a magnetic storage portion is proposed in U.S. Pat. No. 4,864,332. This camera includes means for rewinding a film which is partway photographed into a film cartridge, and if the means rewinds a partway photographed film into the film cartridge, the camera records the frame number of the last photographed frame on the film. If the film cartridge in which the partway photographed film is rewound is re-loaded into the camera, the camera reads the data recorded on the film and automatically transports the film up to a frame which is not yet photographed, so that a user can start photography from the un-photographed frame.

U.S. Pat. No. 4,947,197 proposes a film cartridge having state-of-use-of-film indication means for indicating the state of use of the film accommodated in the film cartridge, i.e., a state in which all the frames are exposed, a state in which the frames are only partially exposed, or a state in which all the frames are unexposed.

Japanese Laid-Open Patent Application No. Hei 4-36502 proposes a camera of the type which employs a film cartridge having such state-of-use-of-film indication means. If a film cartridge whose state-of-use-of-film indication means indicates "THE FRAMES ARE ONLY PARTIALLY EXPOSED" is re-loaded into the camera, the camera transports the film up to an unexposed frame. However, if an exposed frame is not detected while the film is being transported up to the unexposed frame, the camera rewinds the film and sets the indication of the state-of-use-of-film indication means to "ALL THE FRAMES ARE EXPOSED".

Japanese Laid-Open Patent Application No. Hei 7-20558 proposes a camera which reproduces information magnetically recorded on a film during rewinding of the film and, if an abnormality is detected, gives a warning or again records information on the film.

However, in the case of Japanese Laid-Open Patent Application No. Hei 4-36502, if a film cartridge which indicates "THE FRAMES ARE ONLY PARTIALLY EXPOSED" is not re-loaded into the camera, a user cannot notice an abnormality of the camera or the film cartridge, so that the user will leave the camera or the film cartridge abnormal. Since the camera or the film cartridge cannot be used because of the abnormality at the time of the next photography, the user will lose a precious shutter opportunity.

In addition, even if the camera detects an abnormality, the user cannot determine which is abnormal, the camera itself or the film cartridge. If the user mistakes an abnormality of the camera itself for an abnormality of the film cartridge and carries out photography, the user will encounter the problem of continuing photography without noticing that no magnetic recording is being made on the film.

Japanese Laid-Open Patent Application No. Hei 7-20558 takes no account of and makes no reference to the relationship between the detection of an abnormality and the use of the film cartridge having the state-of-use-of-film indication means, film midroll interrupt processing which is carried out for MRI processing, or the like.

BRIEF SUMMARY OF THE INVENTION

One aspect of the present invention is to provide a camera or an apparatus for a camera, which is arranged to record photographed-frame information indicative of a photographed frame on photographed frames of a film on a frame-by-frame basis, and which comprises an indication device which gives a midroll interrupt indication for rewinding a film which is partway used into a film cartridge, a film transport device which rewinds the film which is partway used into the film cartridge in accordance with the midroll interrupt indication given by the indication device, and a determination device which determines whether the photographed-frame information is recorded on photographed frames of the film on a frame-by-frame basis, while the film transport device is rewinding the film into the film cartridge in accordance with the midroll interrupt indication given by the indication device. The aforesaid camera or apparatus for a camera is intended to prevent the problem that if a film cartridge in which a partway used film is rewound is reused in a camera, the camera fails to correctly detect the position of an unused frame and causes an accident such as double exposure.

The above and other aspects of the present invention will become apparent from the following detailed description of preferred embodiments of the present invention, taken in conjunction with the accompanying drawings.

DETAILED DESCRIPTION OF THE INVENTION

Preferred embodiments of the present invention will be described below with reference to the accompanying drawings.

Figure 1:
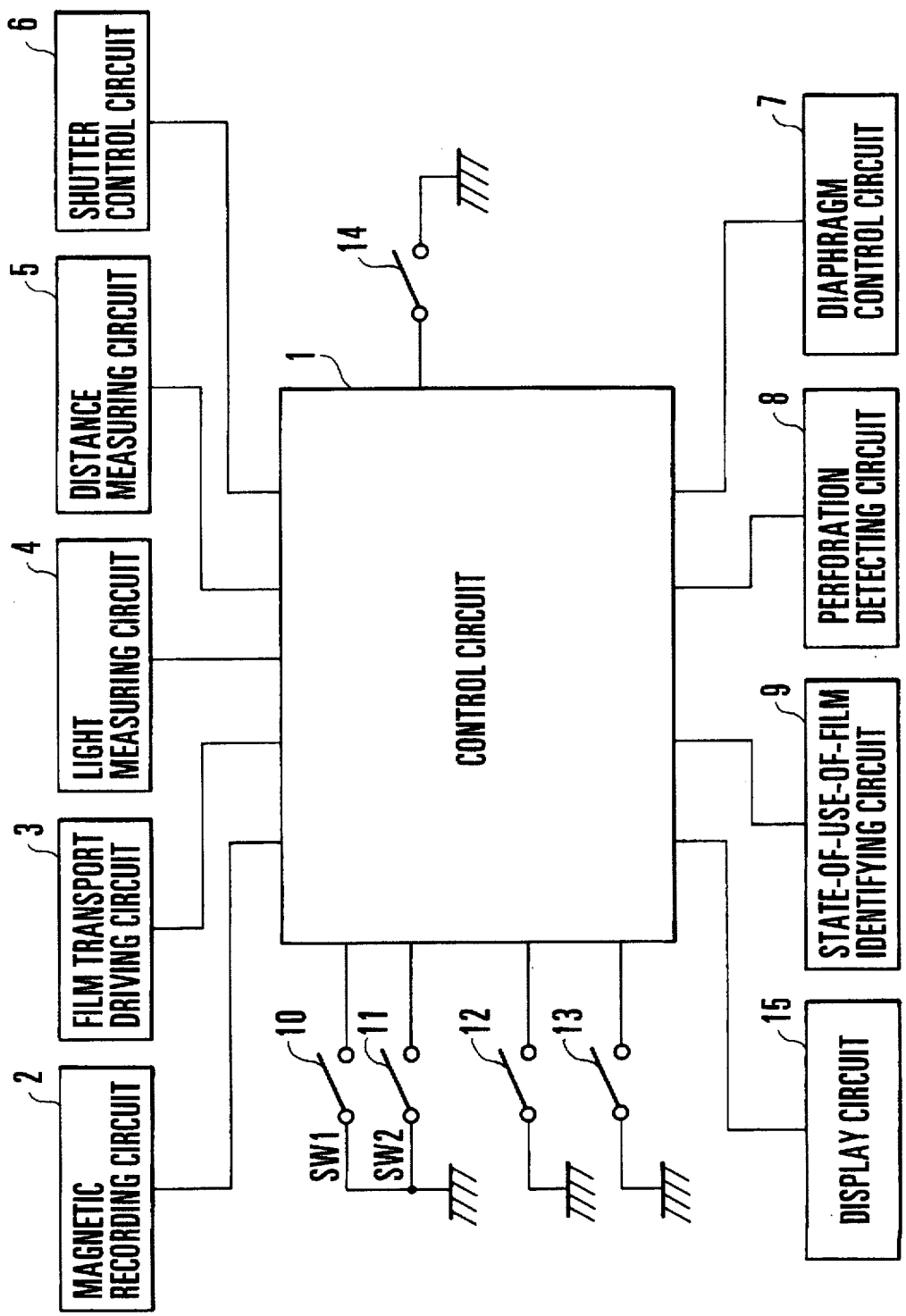
FIG. 1 is a block diagram showing the electrical arrangement of a camera according to a first embodiment of the present invention.

FIG. 1 is a block diagram showing the electrical arrangement of a camera according to a first embodiment of the present invention. The electrical arrangement shown in FIG. 1 includes a control circuit 1 for executing control of the entire camera, which is composed of a microcomputer and the like, a magnetic recording circuit 2 for controlling a magnetic head (not shown) and executing writing and reading of information to and from a magnetic storage portion formed on a film, a film transport driving circuit 3 for driving a film transport motor which performs winding and rewinding of the film, a light measuring circuit 4, a distance measuring circuit 5, a shutter control circuit 6, a diaphragm control circuit 7, and a perforation detecting circuit 8 for detecting perforations of the film through a photoreflector and the like.

The electrical arrangement shown in FIG. 1 also includes a state-of-use-of-film identifying circuit 9 for identifying an indication of indication means for indicating the state of use of the film, an SW1 switch 10 for starting measurement of light, an SW2 switch 11 for starting exposure, the SW1 switch 10 and the SW2 switch 11 being arranged to be respectively turned on at first and second strokes of a shutter release member, a film cartridge switch 12 for detecting whether a film cartridge is loaded into the camera, a cartridge chamber lid switch 13 for detecting whether a cartridge chamber lid or a back lid is closed, a midroll interrupt (MRI) switch 14 for forcedly rewinding the film with the film being partway photographed, and a display circuit 15 for displaying an aperture value, a shutter speed, film sensitivity, various warnings and the like.

Figure 2:
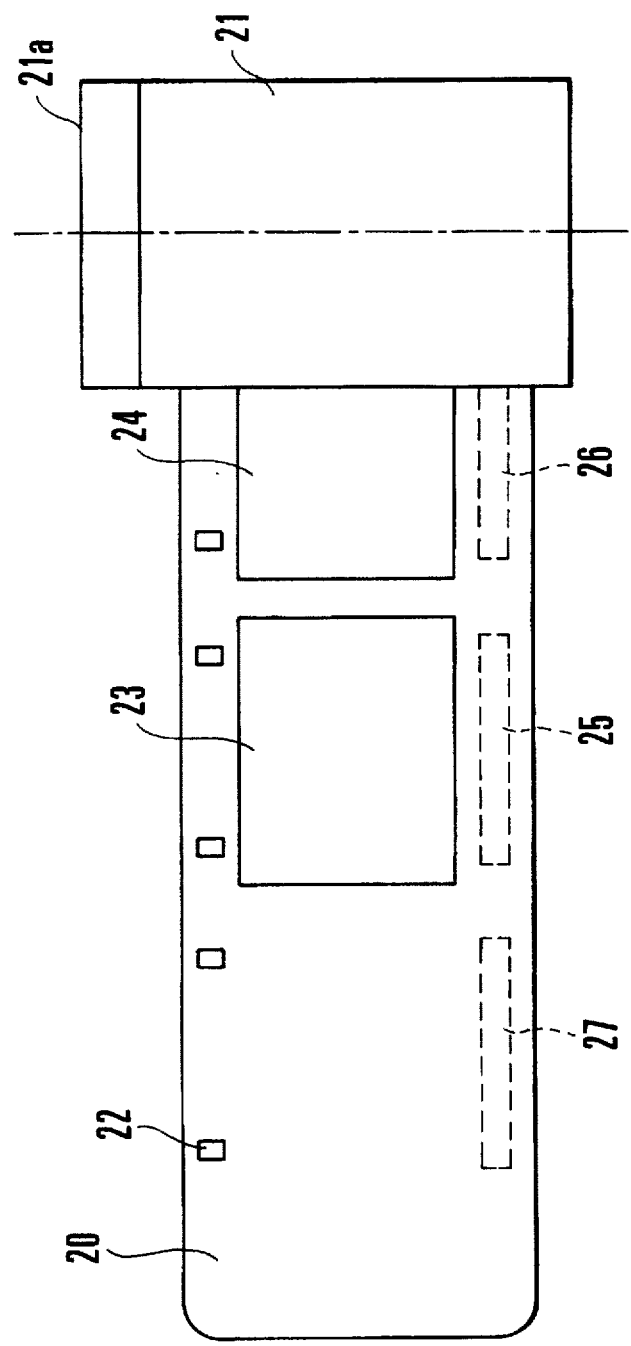
FIG. 2 is a view showing a state in which a film having magnetic storage portions is partially drawn from a film cartridge for use in the camera shown in FIG. 1.

FIG. 2 is a view showing a state in which a film having magnetic storage portions is partially drawn from a film cartridge for use in the camera shown in FIG. 1.

As shown in FIG. 2, a film 20 provided with magnetic storage portions which will be described later is accommodated in a film cartridge 21, and the film cartridge 21 is provided with indication means 21a which rotates integrally with a film feeding spool and which indicates the state of use of the accommodated film 20, i.e., a state in which all the frames are unexposed (hereinafter referred to UN), a state in which the frames are only partially exposed (hereinafter referred to PA), or a state in which all the frames are exposed (hereinafter referred to EX). (Since the construction of such film cartridge is described in detail in Japanese Laid-Open Patent Application No. Hei 4-304440, the detailed description of the film cartridge is omitted herein for the sake of simplicity.)

The film 20 has perforations 22, and magnetic recording portions 25 and 26 on each of which information is magnetically recorded are provided on the film 20 at locations corresponding to photographic image planes 23 and 24, respectively. The photographic image plane 23 is formed in the first frame. A magnetic recording portion 27 on which to record detection results and the like is provided between the photographic image plane 23 of the first frame and the leader portion of the film 20.

Figure 3:
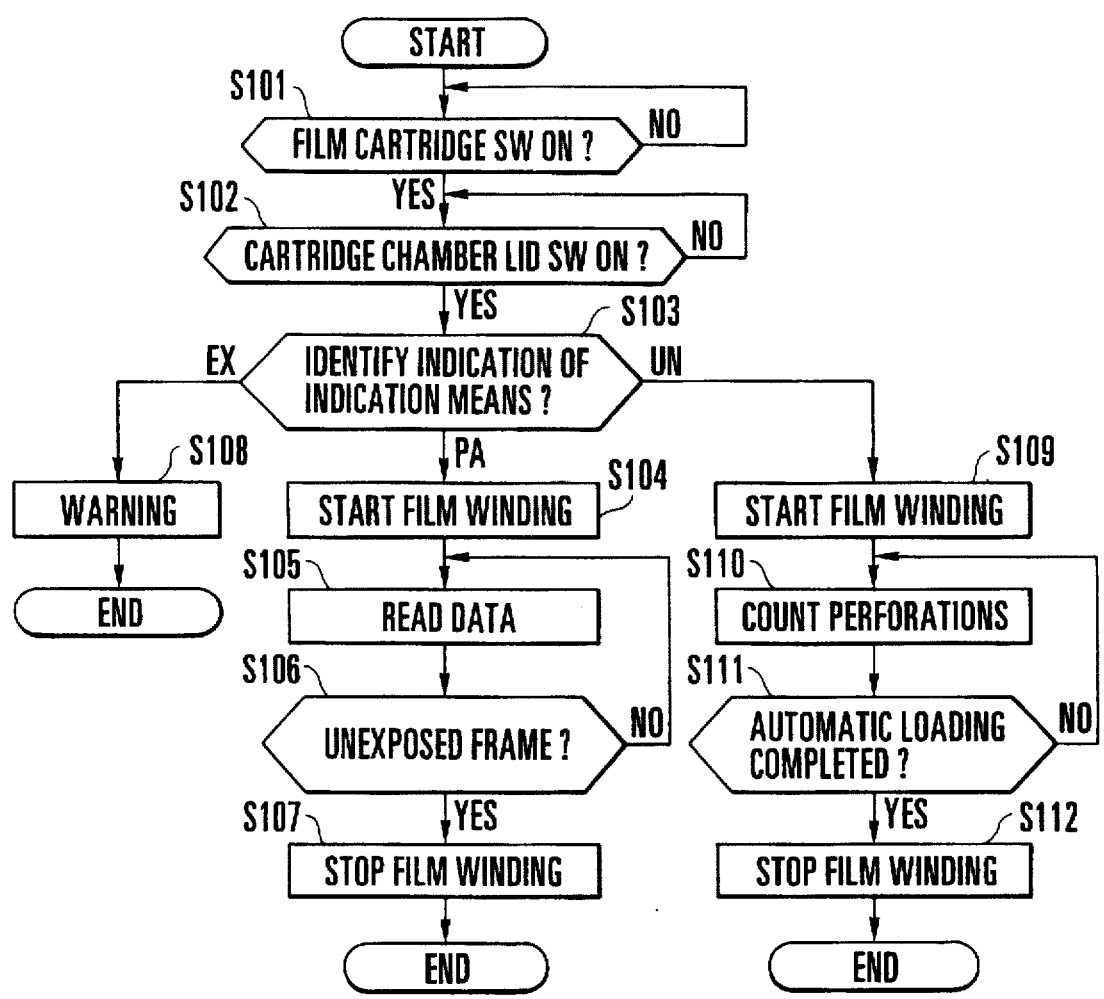
FIG. 3 is a flowchart of the operation of the control circuit 1 shown in FIG. 1, in which the process proceeds up to the completion of preparation for photography.
Figure 4:
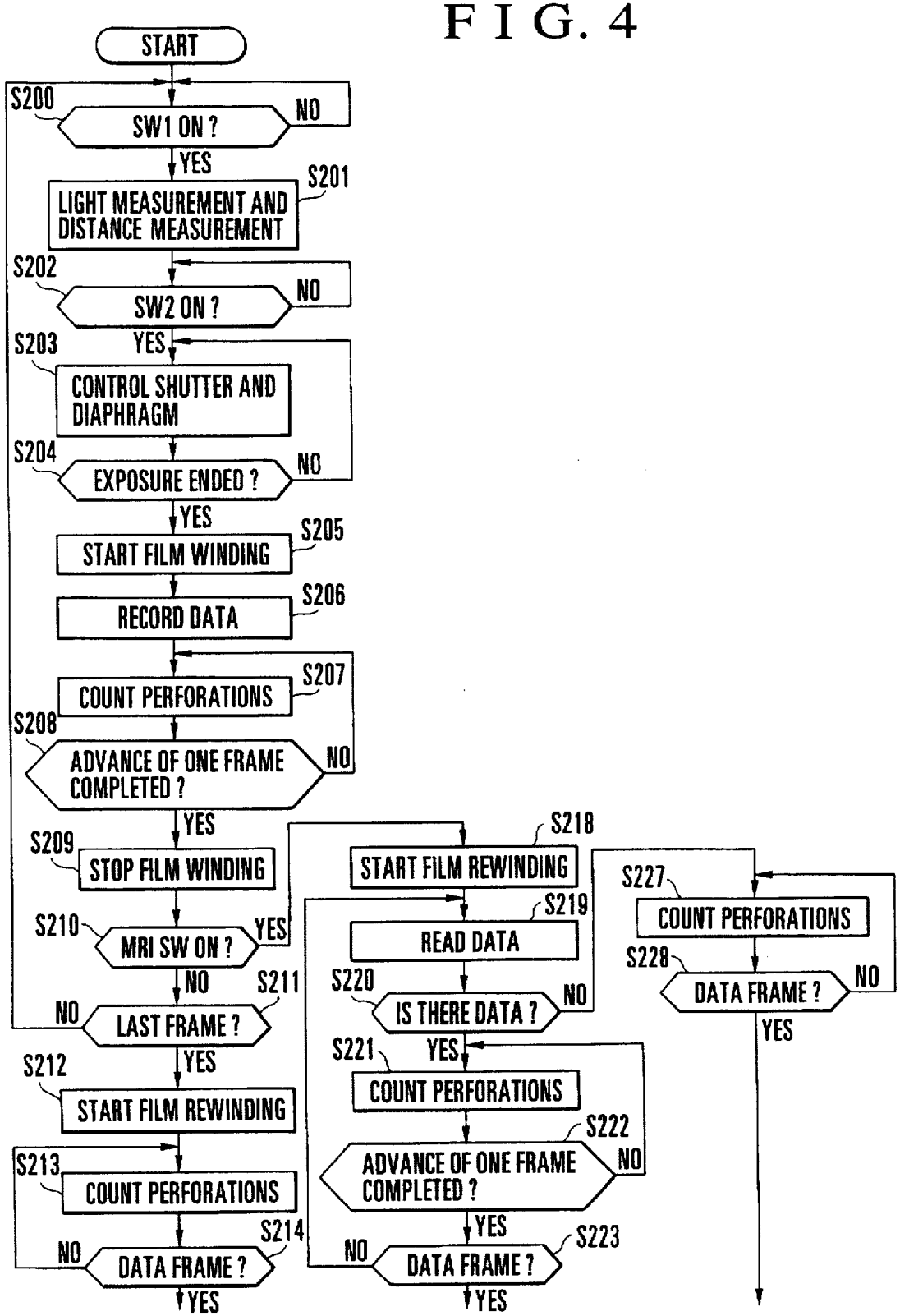
FIG. 4 is a flowchart showing the operation of the control circuit 1, in which the process proceeds from the start of photography to the execution of film rewinding.
Figure 5:
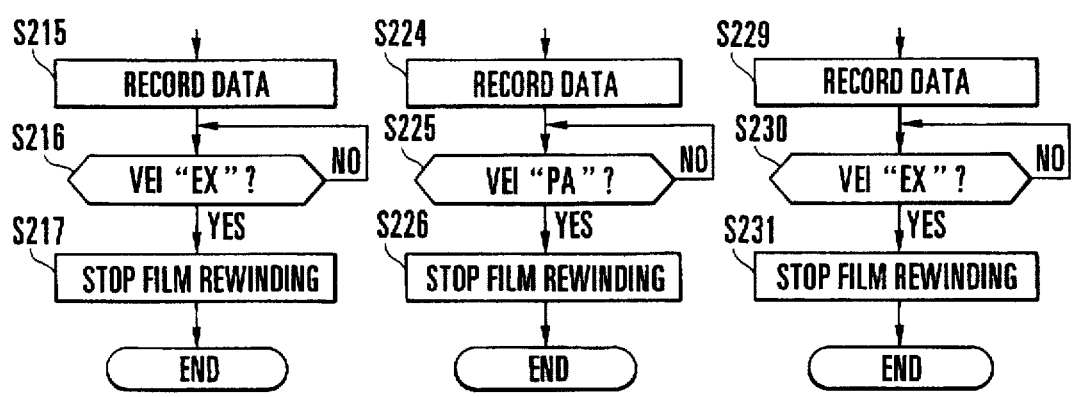
FIG. 5 is a flowchart of the detected data recording operation of the control circuit 1.

FIG. 3 is a flowchart of the operation of the control circuit 1 shown in FIG. 1, in which the process proceeds up to the completion of preparation for photography, FIG. 4 is a flowchart of the operation of the control circuit 1, in which the process proceeds from the start of photography to the execution of film rewinding, and FIG. 5 is a flowchart of the detected data recording operation of the control circuit 1.

The operation of the above-described arrangement will be described below with reference to the flowcharts shown in FIGS. 3, 4 and 5.

If the film cartridge 21 is loaded into a cartridge chamber (not shown) of the camera, the film cartridge switch 12 is turned on (S101). Further, if a cartridge chamber lid (not shown) is closed, the cartridge chamber lid switch 13 is turned on (S102).

Then, the control circuit 1 identifies the indication of the indication means 21a of the loaded film cartridge 21 via the state-of-use-of-film identifying circuit 9 (S103). If the state of use of the film 20 is identified as "EX", the control circuit 1 instructs the display circuit 15 to display a warning that all the frames of the film 20 are exposed and unavailable (S108). If the state of use of the film 20 is identified as "UN", the control circuit 1 causes the film transport driving circuit 3 to drive the film transport motor (not shown) to start automatic loading of the film 20 (S109).

Then, the control circuit 1 starts counting of the perforations 22 of the film 20 via the perforation detecting circuit 8 (S110). The control circuit 1 determines whether the count value of the perforations 22 has reached a predetermined number, and determines whether automatic loading of the film 20 has been completed. If it is determined that the automatic loading has not yet been completed, the process returns to S110 (S111). If it is determined that the automatic loading has been completed, the control circuit 1 causes the film transport driving circuit 3 to stop the film transport motor (S112).

If the state of use of the film 20 is identified as "PA" in Step S103, the control circuit 1 causes the film transport driving circuit 3 to drive the film transport motor to start winding of the film 20 (S104). Then, the control circuit 1 causes the magnetic recording circuit 2 to drive the magnetic head to start reading of data recorded on the magnetic storage portions of the film 20 (S105).

The control circuit 1 determines in Step S106 whether a frame corresponding to a magnetic storage portion which is currently being read is exposed, by determining whether data is recorded on the magnetic storage portion. Specifically, if data is recorded on the magnetic storage portion which is currently being read, the control circuit 1 determines in Step S106 that the corresponding frame is exposed, and the process returns to Step S105. If no data is recorded on the magnetic storage portion which is currently being read, the control circuit 1 determines in Step S106 that the corresponding frame is unexposed, and causes the film transport driving circuit 3 to stop the film transport motor (S107). Through the above-described sequence, the film 20 is advanced until an unexposed frame is reached.

The process proceeds to the flowchart of FIG. 4 which shows the operation of the control circuit 1 in which the process proceeds from the start of photography to the execution of film rewinding. First, the control circuit 1 determines whether the SW1 switch 10 is turned on (S200). If the SW1 switch 10 is turned on, the control circuit 1 activates the light measuring circuit 4 and the distance measuring circuit 5 and performs a light measuring operation and a distance measuring operation on the basis of the information obtained from both circuits 4 and 5 (S201).

Then, the control circuit 1 determines whether the SW2 switch 11 is turned on (S202). If the SW2 switch 11 is turned on, the control circuit 1 causes the shutter control circuit 6 and the diaphragm control circuit 7 to start an exposure operation (S203). Then, the control circuit 1 determines whether the exposure operation has ended (S204). Incidentally, whether the exposure operation has ended can be determined, for example, by using a known running-of-shutter-trailing-curtain completion signal or the like.

Then, the control circuit 1 causes the film transport driving circuit 3 to drive the film transport motor to start winding of the film 20 (S205), and causes the magnetic recording circuit 2 to drive the magnetic head to record photography data, an arbitrary comment and the like on the corresponding magnetic storage portion of the film 20 (S206). The control circuit 1 counts the perforations 22 of the film 20 via the perforation detecting circuit 8 (S207), and determines whether the count value of the perforations 22 has reached a number for one frame (S208). If the advance of the film 20 by one frame has not yet been completed, the process returns to Step S207, whereas if such advance has been completed, the control circuit 1 causes the film transport driving circuit 3 to stop the film transport motor to stop winding of the film 20 (S209).

Then, the control circuit 1 determines whether the MRI switch 14 is turned on (S210), and if the MRI switch 14 is turned on, the process proceeds to Step S218. If the MRI switch 14 is not turned on, the control circuit 1 determines in Step 211 whether the photographed frame is the last frame. If the photographed frame is not the last frame, the process returns to Step S200, whereas if the photographed frame is the last frame, the control circuit 1 causes the film transport driving circuit 3 to drive the film transport motor to rotate the film feeding spool of the film cartridge 21 in a film rewinding direction, thereby starting rewinding of the film 20 (S212). The control circuit 1 counts the perforations 22 of the film 20 via the perforation detecting circuit 8 (S213) and determines whether the magnetic storage portion 27 of the film 20 shown in FIG. 2 is opposed to the magnetic head (S214). If the answer in Step S214 is NO, the process returns to Step S213.

If it is determined in Step 210 that the MRI switch 14 is turned on, the control circuit 1 causes the film transport driving circuit 3 to drive the film transport motor to start rewinding of the film 20 (S218). Then, the control circuit 1 causes the magnetic recording circuit 2 to drive the magnetic head to rotate the film feeding spool of the film cartridge 21 in a film rewinding direction, thereby starting reading of data magnetically recorded on the film 20 (S219). The control circuit 1 determines whether data is recorded on the magnetic storage portion of a frame which is being rewound (S220), and if data is recorded on the magnetic storage portion, the control circuit 1 starts counting of the perforations 22 of the film 20 via the perforation detecting circuit 8 (S221).

In Step S222, the control circuit 1 determines whether the count value of the perforations 22 has reached a number for one frame. If the number for one frame has not yet been reached, the process returns to Step S221, whereas if the number for one frame has been reached, the control circuit 1 determines whether the magnetic storage portion 27 of the film 20 is opposed to the magnetic head (S223). If the answer in Step S223 is NO, the process returns to Step S219.

If it is determined in Step S220 that no data is recorded on the magnetic storage portion, the control circuit 1 starts counting of the perforations 22 via the perforation detecting circuit 8 (S227), and continues to rewind the film 20 until all the frames are accommodated into the film cartridge 21. The control circuit 1 determines in Step S228 whether the magnetic storage portion 27 of the film 20 is opposed to the magnetic head. If the answer in Step S228 is NO, the process returns to Step S227.

Then, the process proceeds to the flowchart of the data recording operation shown in FIG. 5. If it is determined in Step S214 that the magnetic storage portion 27 of the film 20 is opposed to the magnetic head, the control circuit 1 causes the magnetic head to record data, such as data common to all the frames, on the magnetic storage portion 27 of the film 20 (S215). Then, the control circuit 1 determines via the state-of-use-of-film identifying circuit 9 whether the indication of the indication means 21a which rotates integrally with the film feeding spool of the film cartridge 21 has changed to a position indicative of "ALL FRAMES ARE EXPOSED: EX" (S216). If the answer in Step S216 is YES, the control circuit 1 causes the film transport driving circuit 3 to stop the film transport motor to stop rewinding of the film 20, and sets the indication of the indication means 21a to "All FRAMES ARE EXPOSED: EX" (S217).

If it is determined in Step S223 that the magnetic storage portion 27 of the film 20 is opposed to the magnetic head, the control circuit 1 causes the magnetic head to record data, such as data common to all the frames of the film 20, on the magnetic storage portion 27 of the film 20 (S224). Then, the control circuit 1 determines via the state-of-use-of-film identifying circuit 9 whether the indication of the indication means 21a has changed to a position indicative of "THE FRAMES ARE ONLY PARTIALLY EXPOSED: PA" (S225). If the answer in Step S225 is YES, the control circuit 1 causes the film transport driving circuit 3 to stop the film transport motor to stop rewinding of the film 20, and sets the indication of the indication means 21a to "THE FRAMES ARE ONLY PARTIALLY EXPOSED: PA" (S226).

If it is determined in Step S228 that the magnetic storage portion 27 of the film 20 is opposed to the magnetic head, the control circuit 1 causes the magnetic head to record data indicating that a frame having no magnetic recording has been detected, on the magnetic storage portion 27 of the film 20 (S229). Then, the control circuit 1 determines via the state-of-use-of-film identifying circuit 9 whether the indication of the indication means 21a has changed to the position indicative of "ALL FRAMES ARE EXPOSED: EX" (S230). If the answer in Step S230 is YES, the control circuit 1 causes the film transport driving circuit 3 to stop the film transport motor to stop rewinding of the film 20, and sets the indication of the indication means 21a to "ALL FRAMES ARE EXPOSED: EX" (S231).

As described above, even if a film which is partially used is rewound, the indication of the indication means 21a of the film cartridge 21 is set to "ALL FRAMES ARE EXPOSED: EX" if an exposed frame having no magnetic recording indicative of photographed-frame information is detected. This is intended to inhibit reuse of such a film cartridge, because if such a film cartridge is reused, an exposed frame having no such magnetic recording is erroneously determined as an unused frame because of the absence of such magnetic recording in spite of an exposed frame, with the result that photography is started at the position of the exposed frame and an accident such as double exposure is caused.

As is apparent from the above description, in accordance with the first embodiment, if a photographed frame having no data recorded on the corresponding magnetic storage portion is detected during rewinding of the film 20, data to that effect is recorded on the magnetic storage portion 27 of the film 20 and the indication of the indication means 21a of the film cartridge 21 is set to "ALL FRAMES ARE EXPOSED". Accordingly, reuse of an abnormal cartridge is inhibited so that double exposure or the like is prevented from being erroneously caused.

Figure 6:
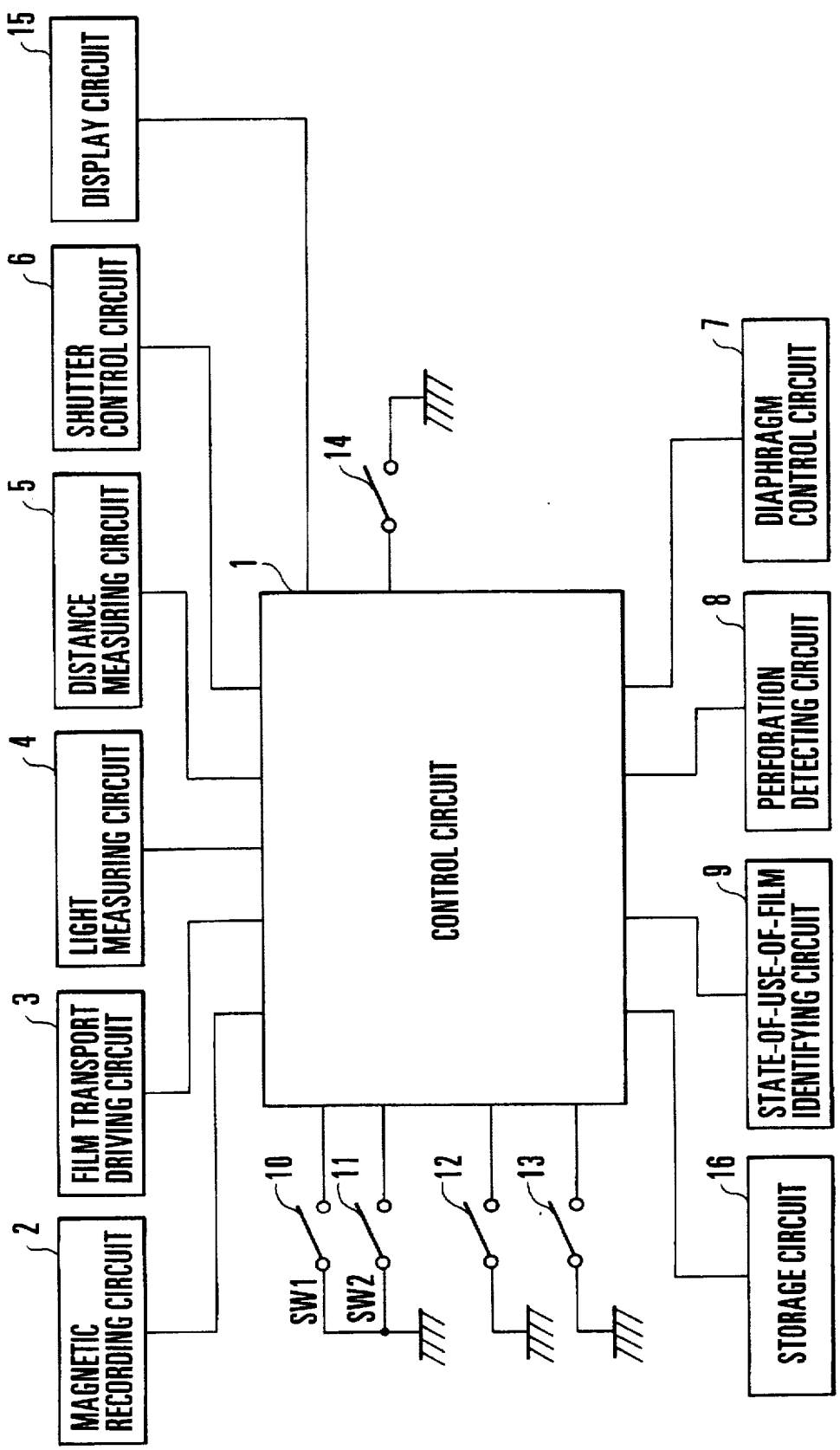
FIG. 6 is a block diagram showing the electrical arrangement of a camera according to a second embodiment of the present invention.
Figure 7:
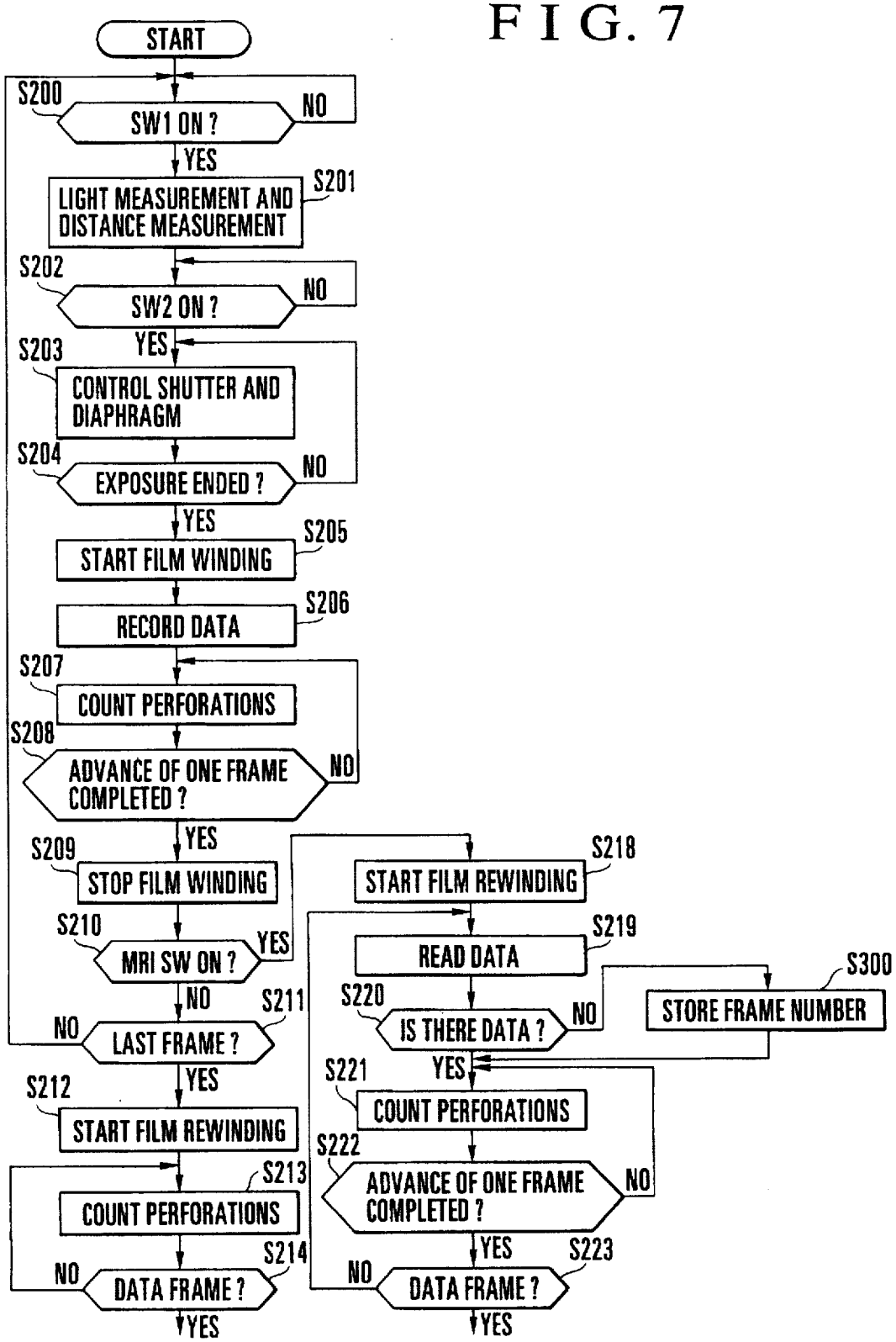
FIG. 7 is a flowchart of the operation of the control circuit 1 shown in FIG. 6, in which the process proceeds from the start of photography to the execution of film rewinding.
Figure 8:
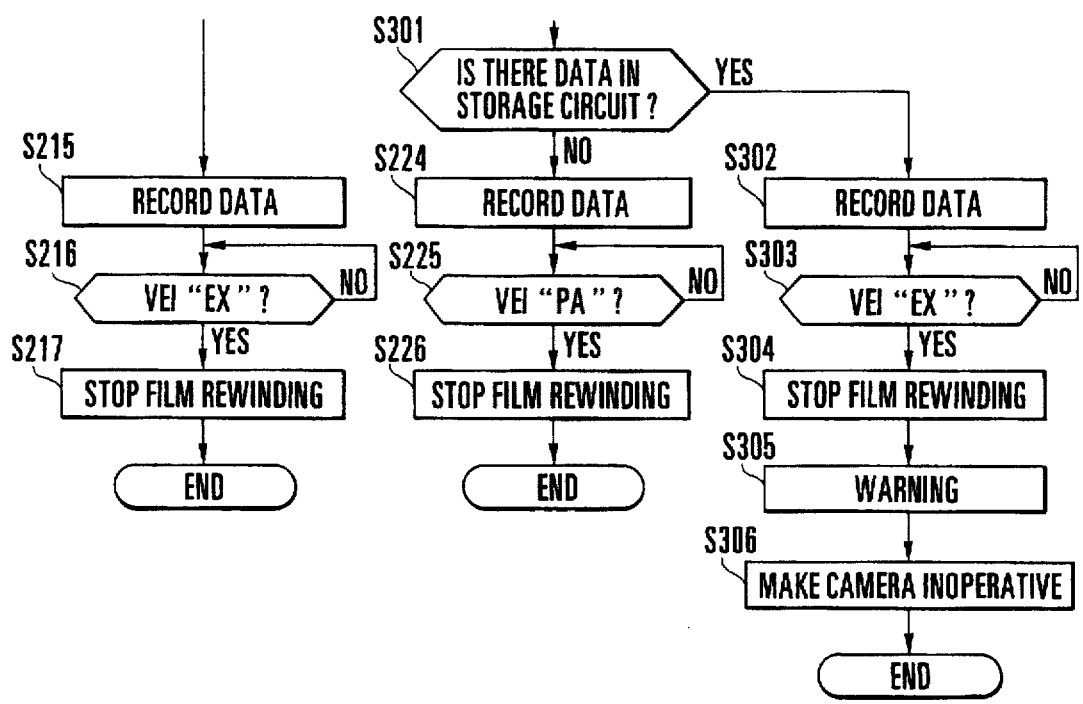
FIG. 8 is a flowchart of the data-to-be-stored recording operation of the control circuit 1 shown in FIG. 6.

FIG. 6 is a block diagram showing the electrical arrangement of a camera according to a second embodiment of the present invention. In the arrangement shown in FIG. 6, a storage circuit 16 is a circuit for storing the frame number of a photographed frame of a film if it is determined during a midroll interrupt operation of the film that there is no data in the magnetic storage portion of the photographed frame. In FIG. 6, identical reference numerals are used to denote constituent elements identical to those shown in FIG. 1, and the description thereof is omitted herein for the sake of simplicity. FIG. 7 is a flowchart of the operation of the control circuit 1 shown in FIG. 6, in which the process proceeds from the start of photography to the execution of film rewinding. FIG. 8 is a flowchart of the data-to-be-stored recording operation of the control circuit 1 shown in FIG. 6.

The operation of the second embodiment will be described with reference to the flowcharts shown in FIGS. 7 and 8.

In the flowchart shown in FIG. 7, in which the process proceeds from the start of photography to the execution of film rewinding, Step S300 is only substituted for Steps S227 and S228 in the flowchart of the first embodiment shown in FIG. 4, in which the process proceeds from the start of photography to the execution of film rewinding.

If it is determined in Step S220 that a frame has no data recorded on its magnetic storage portion, the frame number of the frame is stored in the storage circuit 16 in Step S300. Since the processing of the other steps S200 to S223 is the same as that of the flowchart shown in FIG. 4, the description thereof is omitted for the sake of simplicity.

The flowchart of the data recording operation shown in FIG. 8 differs from the data recording flowchart of the first embodiment shown in FIG. 5 in that the processing of Steps S301 to S306 is substituted for the processing of Steps S229 to S231.

If it is determined in Step S223 that the magnetic storage portion 27 of the film 20 is opposed to the magnetic head, the control circuit 1 determines whether a frame number is stored in the storage circuit 16 (S301). If no frame number is stored, the control circuit 1 performs the processing of Step S224 (for data recording) to Step S226, which is the same as the processing of Steps S224 to S226 in the flowchart of the first embodiment of FIG. 5.

If a frame number is stored, the control circuit 1 records the data stored in the storage circuit 16 on the magnetic storage portion 27 of the film 20 via the magnetic head (S302). Then, the control circuit 1 determines via the state-of-use-of-film identifying circuit 9 whether the indication of the indication means 21a has changed to a position indicative of "ALL FRAMES ARE EXPOSED: EX" (S303). If the answer in Step S303 is YES, the control circuit 1 causes the film transport driving circuit 3 to stop the film transport motor to stop rewinding of the film 20, and sets the indication of the indication means 21a to "ALL FRAMES ARE EXPOSED: EX" (S304).

Furthermore, the control circuit 1 causes the display circuit 15 to display a warning that an abnormality has occurred in the recording or reading function of the camera (S305). The control circuit 1 inhibits the operation of the camera (S306). Incidentally, the general operation of the second embodiment from the loading of the film cartridge 21 to the completion of preparation for photography is completely the same as the operation of the first embodiment shown in FIG. 3, and the description of such general operation is omitted for the sake of simplicity.

As is apparent from the above description, in accordance with the second embodiment, if a photographed frame having no data recorded on the magnetic storage portion is detected during midroll interrupt processing of the film 20, the frame number of the photographed frame is stored in the storage circuit 16 and the stored data is recorded on the magnetic storage portion 27 of the film 20. In addition, the indication of the indication means 21a of the film cartridge 21 is set to "ALL FRAMES ARE EXPOSED" and a warning that an abnormality has occurred in the recording and reading function of the camera is displayed, and after the completion of rewinding, the camera is made inoperative. Accordingly, it is possible to clearly inform a user of the occurrence of the abnormality and prevent the user from continuing photography without noticing a failure in magnetic recording.

Figure 9:
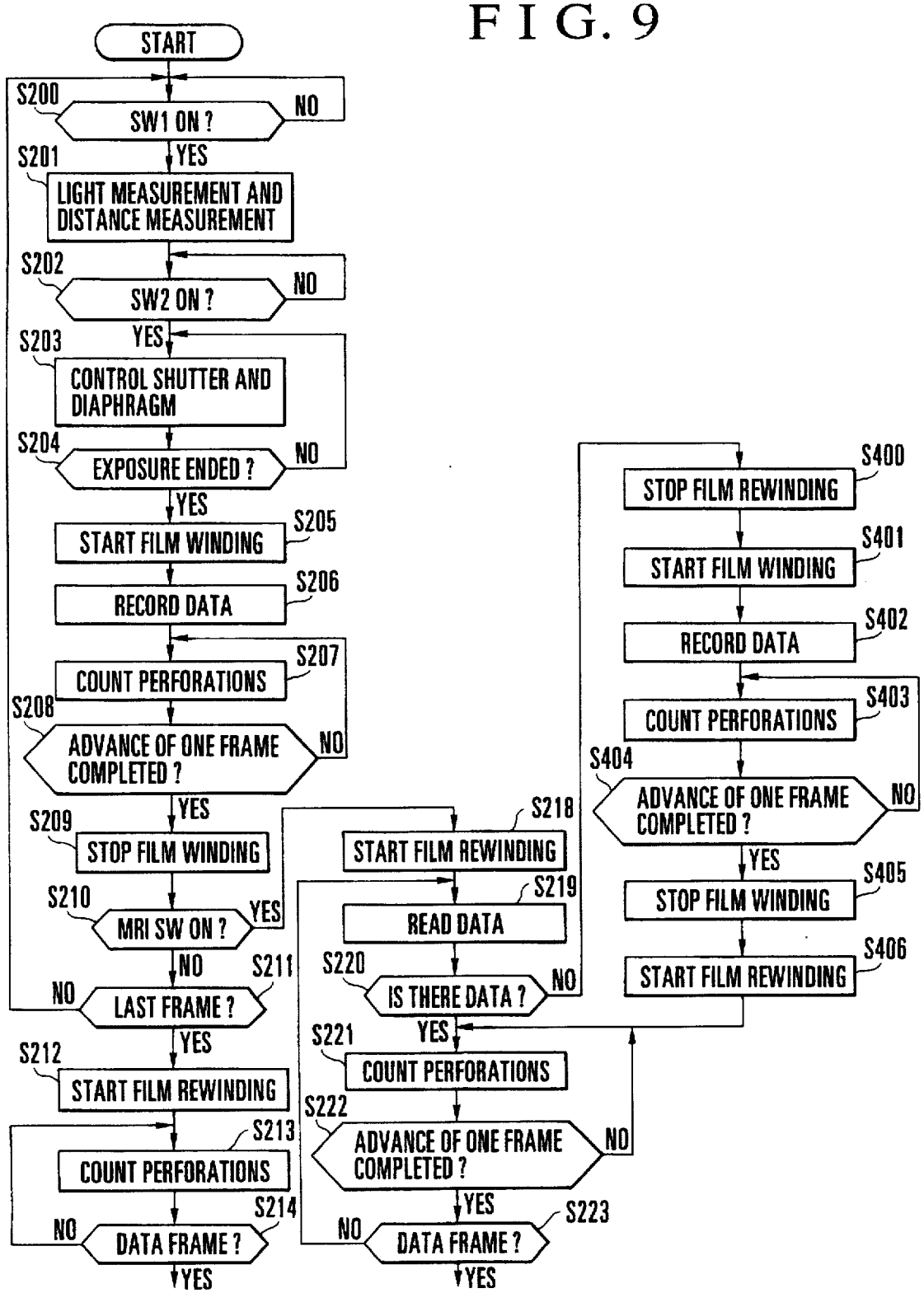
FIG. 9 is a flowchart of the operation of the control circuit 1 according to a third embodiment, in which the process proceeds from the start of photography to the execution of film rewinding.
Figure 10:
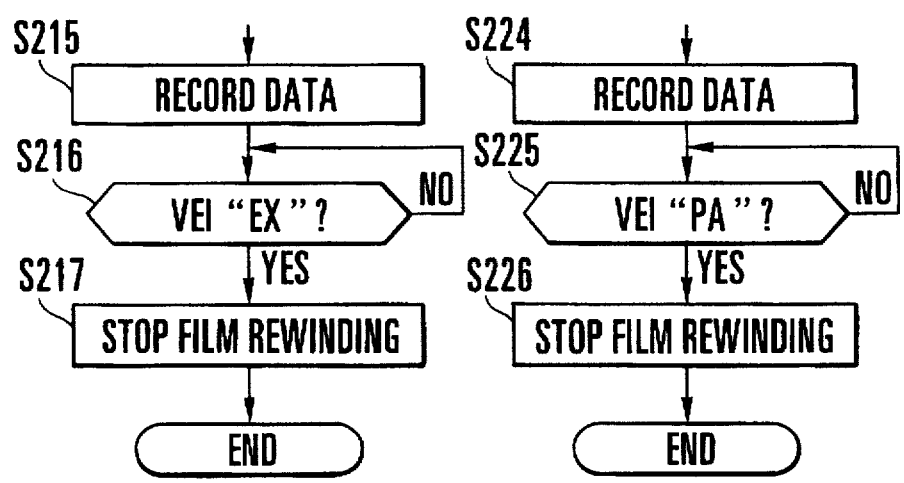
FIG. 10 is a flowchart of the detected data recording operation of the control circuit 1 shown in FIG. 9.

FIG. 9 is a flowchart of the operation of the control circuit 1 of FIG. 1 according to a third embodiment, in which the process proceeds from the start of photography to the execution of film rewinding. FIG. 10 is a flowchart of the detected data recording operation of the control circuit 1 according to the third embodiment.

The flowchart of FIG. 9 in which the process proceeds from the start of photography to the execution of film rewinding differs from the flowchart of the first embodiment shown in FIG. 4 in that the processing of Steps S227 and S228 is substituted for by the processing of Steps S400 to S406. Incidentally, the block diagram of the electrical arrangement of a camera according to the first embodiment is the same as that shown in FIG. 1.

In Step S220, the control circuit 1 determines whether data is recorded on the magnetic storage portion of a frame which is being rewound, and if no data is recorded on the magnetic storage portion, the control circuit 1 causes the film transport driving circuit 3 to stop rewinding of the film 20 (S400). Then, the control circuit 1 causes the film transport driving circuit 3 to start winding of the film 20 (S401), and causes the magnetic recording circuit 2 to drive the magnetic head to record predetermined data on the corresponding magnetic storage portion of the film (S402). This predetermined data may be any data such as data previously stored in the camera or data recorded on the magnetic storage portion of another frame.

Then, the control circuit 1 starts counting of the perforations 22 via the perforation detecting circuit 8 (S403), and determines whether the count value of the perforations 22 has reached a number for one frame (S404). If the number for one frame has not yet been reached, the process returns to Step S403, whereas if the number for one frame has been reached, the control circuit 1 causes the film transport driving circuit 3 to stop winding of the film 20 (S405). Then, the control circuit 1 causes the film transport driving circuit 3 to start rewinding of the film 20 (S406).

The data recording processing flowchart shown in FIG. 10 only differs from the data recording processing flowchart of the first embodiment shown in FIG. 5 in that the processing of Steps S229 to S231 is omitted. Since the processing of Steps S215 to S217 and Steps S224 to S226 is the same as that shown in FIG. 5, the description thereof is omitted for the sake of simplicity.

As is apparent from the above description, in accordance with the third embodiment, if a photographed frame having no data recorded on its magnetic storage portion is detected during the processing of rewinding a film into a film cartridge, predetermined data is written to and stored in the magnetic storage portion of such photographed frame, so that even if the film cartridge is reused, a problem such as double exposure is prevented from occurring.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, in the above-described second embodiment, if it is determined that photographed-frame information is not recorded on all photographed frames of a film, the operation of the camera is inhibited. However, in the present invention, it is possible to adopt not only the method of completely inhibiting the operation of the camera, but also various other limiting methods such as a method which allows such inhibition to be cancelled by manual operation.

The present invention can also be applied to not only the method of magnetically recording or reading information on or from a film, but also various other recording/reading methods such as an electrical method and an optical method.

The present invention can also be applied to a film cartridge of the type which differs from the film cartridge used in each of the above-described embodiments, or to a cartridge having an image recording medium other than a film.

Incidentally, the software arrangement and the hardware arrangement of each of the above-described embodiments may be replaced, as required.

The present invention can also be carried out by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatuses, or may constitute an element which forms part of another apparatus.

The present invention can also be applied to various types of cameras such as single-lens reflex cameras, lens shutter cameras or video cameras, optical apparatuses other than such cameras, apparatuses other than the optical apparatuses, apparatuses applied to the cameras or the optical or other apparatuses, or elements which constitute part of such apparatuses.

I claim:

1. A camera arranged to record photographed-frame information indicative of a photographed frame on photographed frames of a film on a frame-by-frame basis, comprising:

(A) an indication device which gives a midroll interrupt indication for rewinding a film which is partway used into a film cartridge;

(B) a film transport device which rewinds the film which is partway used into the film cartridge in accordance with the midroll interrupt indication given by said indication device; and (C) a determination device which determines whether the photographed-frame information is recorded on photographed frames of the film on a frame-by-frame basis, while said film transport device is rewinding the film into the film cartridge in accordance with the midroll interrupt indication given by said indication device.

2. A camera according to claim 1, wherein said determination device includes a magnetic head for detecting whether the photographed-frame information is recorded on each of the photographed frames of the film.

3. A camera according to claim 1, wherein said determination device includes a magnetic head for detecting whether the photographed-frame information is recorded on each of the photographed frames of the film, said magnetic head recording the photographed-frame information on each of the photographed frames of the film.

4. A camera according to claim 1, wherein said determination device includes means for setting an index of the film cartridge, which indicates a state of use of the film, to "ALL FRAMES ARE PHOTOGRAPHED" in accordance with said determination device determining that the photographed-frame information is not recorded, and for setting the index of the film cartridge, which indicates the state of use of the film, to "FRAMES ARE ONLY PARTIALLY PHOTOGRAPHED" in accordance with said determination device determining that the photographed-frame information is recorded on each of the photographed frames of the film.

5. A camera according to claim 1, wherein said determination device includes means for recording predetermined information on the film in accordance with said determination device determining that the photographed-frame information is not recorded.

6. A camera according to claim 1, wherein said determination device includes means for recording predetermined information between a leading end and a first frame of the film in accordance with said determination device determining that the photographed-frame information is not recorded.

7. A camera according to claim 1, further comprising a warning device which provides a warning in accordance with said determination device determining that the photographed-frame information is not recorded.

8. A camera according to claim 1, wherein said determination device includes means for restraining an operation of said camera in accordance with said determination device determining that the photographed-frame information is not recorded.

9. A camera according to claim 1, wherein said determination device includes means for making said camera inoperative after completion of rewinding of the film, in accordance with said determination device determining that the photographed-frame information is not recorded.

10. A camera according to claim 1, wherein said determination device includes means for recording predetermined information on a photographed frame on which the photographed-frame information is not recorded, in accordance with said determination device determining that the photographed-frame information is not recorded.

11. A camera arranged to record photographed-frame information indicative of a photographed frame on photographed frames of a film on a frame-by-frame basis, comprising:

(A) a film transport device which rewinds the film into the film cartridge; and (B) a control device which determines whether the photographed-frame information is recorded on each of the photographed frames of the film, while said film transport device is rewinding the film into the film cartridge, said control device, even if the film is rewound in a partway used state, setting an index of the film cartridge, which indicates a state of use of the film, to "ALL FRAMES ARE PHOTOGRAPHED" in accordance with determining that the photographed-frame information is not recorded.

12. A camera according to claim 11, wherein said control device includes a magnetic head for detecting whether the photographed-frame information is recorded on each of the photographed frames of the film.

13. A camera according to claim 11, wherein said control device includes a magnetic head for detecting whether the photographed-frame information is recorded on each of the photographed frames of the film, said magnetic head recording the photographed-frame information on each of the photographed frames of the film.

14. A camera according to claim 11, wherein said control device includes means for setting the index of the film cartridge, which indicates the state of use of the film, to "FRAMES ARE ONLY PARTIALLY PHOTOGRAPHED" in accordance with said control device determining that the photographed-frame information is recorded on each of the photographed frames of the film.

15. A camera according to claim 11, wherein said control device includes means for recording predetermined information on the film in accordance with said control device determining that the photographed-frame information is not recorded.

16. A camera according to claim 11, wherein said control device includes means for recording predetermined information between a leading end and a first frame of the film in accordance with said control device determining that the photographed-frame information is not recorded.

17. A camera according to claim 11, further comprising a warning device which provides a warning in accordance with said control device determining that the photographed-frame information is not recorded.

18. A camera according to claim 11, wherein said control device includes means for restraining an operation of said camera in accordance with said control device determining that the photographed-frame information is not recorded.

19. A camera according to claim 11, wherein said control device includes means for making said camera inoperative after completion of rewinding of the film, in accordance with said control device determining that the photographed-frame information is not recorded.

20. An apparatus for a camera, which is arranged to record photographed-frame information indicative of a photographed frame on photographed frames of a film on a frame-by-frame basis, comprising:

(A) an indication device which gives a midroll interrupt indication for rewinding a film which is partway used into a film cartridge;

(B) a film transport device which rewinds the film which is partway used into the film cartridge in accordance with the midroll interrupt indication given by said indication device; and (C) a determination device which determines whether the photographed-frame information is recorded on photographed frames of the film on a frame-by-frame basis, while said film transport device is rewinding the film into the film cartridge in accordance with the midroll interrupt indication given by said indication device.

21. An apparatus for a camera, which is arranged to record photographed-frame information indicative of a photographed frame on photographed frames of a film on a frame-by-frame basis, comprising:

(A) a film transport device which rewinds the film into the film cartridge; and (B) a control device which determines whether the photographed-frame information is recorded on each of the photographed frames of the film, while said film transport device is rewinding the film into the film cartridge, said control device, even if the film is rewound in a partway used state, setting an index of the film cartridge, which indicates a state of use of the film, to "ALL FRAMES ARE PHOTOGRAPHED" in accordance with determining that the photographed-frame information is not recorded.

* * * * *